(12) United States Patent
Giesey et al.

(10) Patent No.: US 6,394,001 B1
(45) Date of Patent: May 28, 2002

(54) VEHICLE TABLE APPARATUS

(75) Inventors: Jennifer L Giesey, Highland Township; Vernon J Scott, Jr.; Jeffrey M Niemi, both of Milford; Lavern D Schmidt, Jr., Ottawa Lake, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/571,963

(22) Filed: May 16, 2000

(51) Int. Cl.$^7$ ............................................... A47B 23/00
(52) U.S. Cl. .......................................................... 108/44
(58) Field of Search ............................... 108/44, 45, 42, 108/47, 48; 296/57.1; 226/521, 506, 529; 280/400, 638

(56) References Cited

U.S. PATENT DOCUMENTS

| | | | | |
|---|---|---|---|---|
| 2,160,958 A | * | 6/1939 | Critchlow | ................. 108/44 X |
| 2,471,730 A | * | 5/1949 | Doerr | ....................... 108/44 X |
| 3,338,620 A | * | 8/1967 | Cauvin | ..................... 108/44 X |
| 3,736,884 A | * | 6/1973 | Kohner | ......................... 108/48 |
| 3,912,324 A | | 10/1975 | Troyer | |
| 4,455,948 A | | 6/1984 | Torres | |
| 4,852,499 A | | 8/1989 | Ozols | |
| 4,995,322 A | * | 2/1991 | Frederick | ..................... 108/44 |
| 5,511,493 A | | 4/1996 | Kanehl, Jr. | |
| 5,588,697 A | | 12/1996 | Yoshida et al. | |
| 5,771,815 A | | 6/1998 | Leftwich | |
| 5,857,741 A | | 1/1999 | Anderson | |
| 6,045,172 A | * | 4/2000 | Thomas et al. | ........... 108/44 X |
| 6,055,911 A | * | 5/2000 | Krenzer | ....................... 108/44 |
| 6,161,486 A | * | 12/2000 | Boots | .......................... 108/48 |
| 6,193,294 B1 | * | 2/2001 | Disner et al. | ............. 108/44 X |

* cited by examiner

Primary Examiner—Jose V. Chen
(74) Attorney, Agent, or Firm—Thomas A Jurecko

(57) ABSTRACT

A table apparatus for a motor vehicle is provided. The table apparatus includes a table structure that is pivotally attached to the exterior of the vehicle. The table structure includes a top surface, a bottom surface, an upper edge and a lower edge. The table structure is pivotable from a first storage position to a second horizontal position substantially perpendicular to the exterior of the vehicle. The table structure includes a plurality of panels that are telescopically extendable from one another in a direction away from and substantially perpendicular to the vehicle exterior while the table structure is in the second position. The table structure is pivotable about its upper edge and supported in its second position by a rod that is selectively disposed between the cover and one of said plurality of panels. In a second embodiment, the table structure is pivotable about its lower edge and supported by a tether that interconnects the cover and the table structure while the table structure is in its second position.

12 Claims, 3 Drawing Sheets

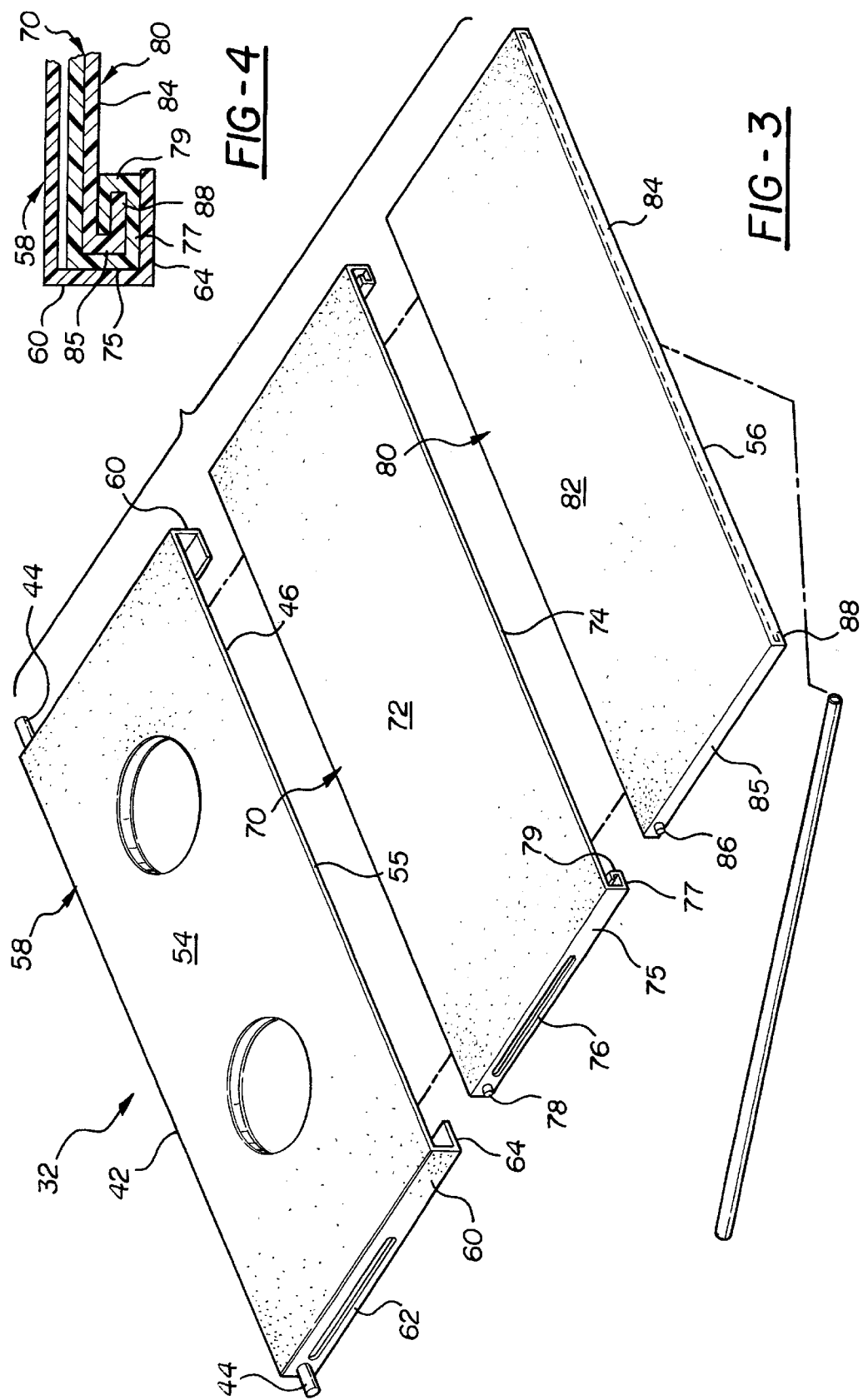

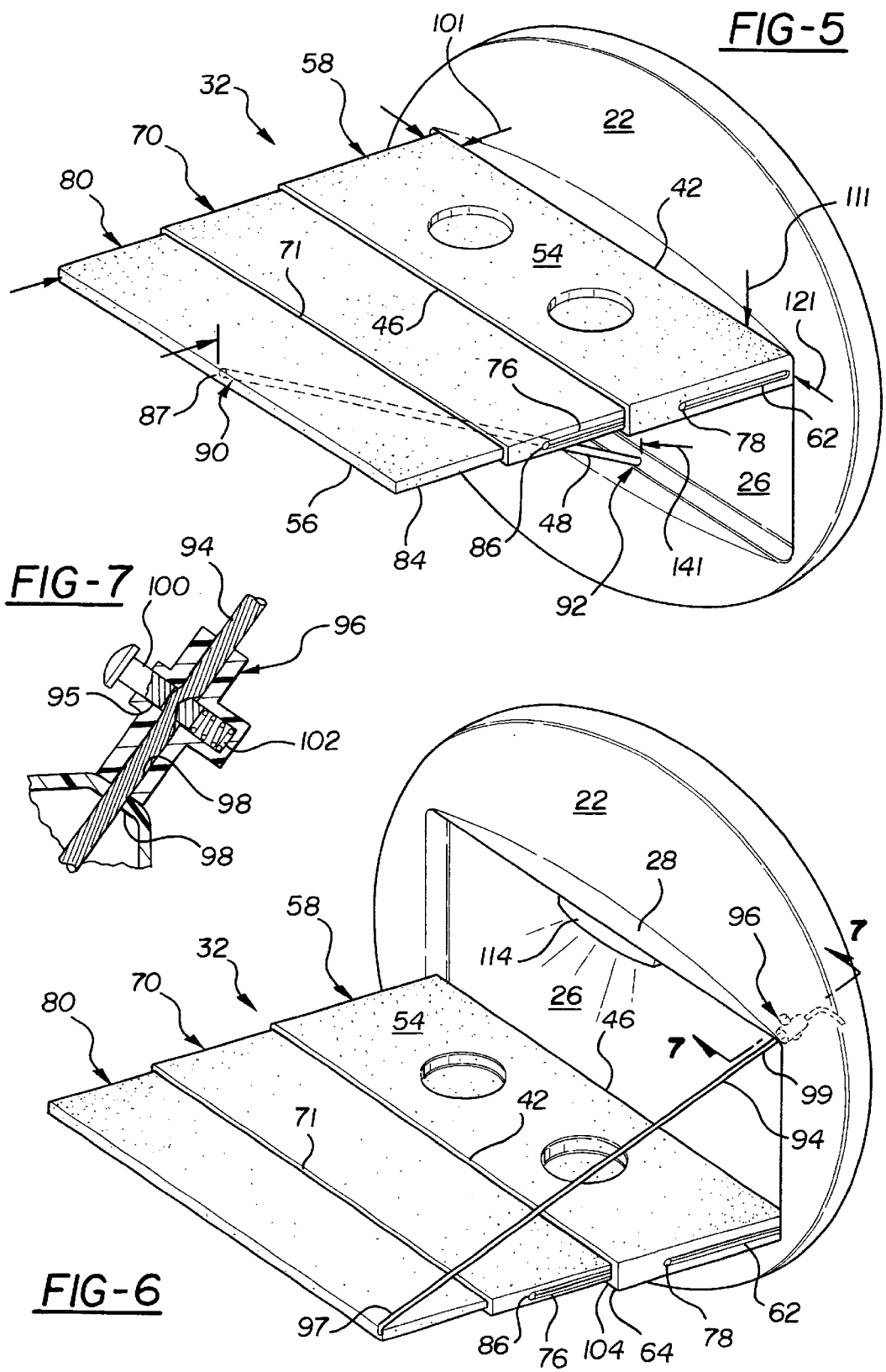

US 6,394,001 B1

VEHICLE TABLE APPARATUS

BACKGROUND OF THE INVENTION

1. Technical Field

The present invention relates in general to motor vehicles. More particularly, the present invention relates to a table apparatus for a motor vehicle. More specifically, but without restriction to the particular embodiment and/or use which is shown and described for purposes of illustration, the present invention relates to a pivotable and telescoping table structure that is constructed in relation to the tailgate or rear end of a vehicle.

2. Discussion

Ever since their inception, automobiles have been changing American society. People now use their automobiles more than ever and, therefore, there is an increasing need to design automobiles to provide more utility and comfort not only while driving but also while the vehicle is immobile.

Many activities conducted around automobiles would be facilitated by having a table-like surface for various items. For example, the activity commonly referred to as 'tailgating' could be more convenient if a table was available for the purpose of supporting food and drink thereon. In fact, this activity most likely received the name 'tailgating' by individuals using the tailgate of a pick-up truck either as a table or as a seating surface for the participants. However, those individuals that would like to participate in such an activity without a pick-up truck need to transport a table within the interior of their vehicle, which is inconvenient and takes up desired interior space.

Some automotive manufacturers have started to provide a table like structure in order to increase the utility of a vehicle while it is immobile. For example, the Honda CR-V includes a table with retractable legs similar to a 'card' table that constructs the rear floor of the vehicle so as to not occupy excessive interior space. When needed the table can be removed from the vehicle floor and used for various activities. Another example is the rear shelf employed in the Chrysler PT Cruiser which is a subject of the commonly assigned co-pending patent applications Serial Nos. 09/218,314 filed Dec. 22, 1998 and Ser. No. 09/334,804 filed Jun. 17, 1999. The rear shelf can be disposed in a position such that it extends from out of the storage compartment of the vehicle to act as a table surface for various activities. Although both of these arrangements are extremely useful there continues to be a need in the art to provide a table structure that it used and stored outside of the interior of the vehicle. There is also a need to provide a table structure that is easy to use and is stored compactly on the exterior of the vehicle. There is a further need to provide a design that can be employed using similar parts while meeting a plurality of international vehicle requirements.

SUMMARY OF THE INVENTION

Accordingly, it is the principal objective of the present invention to provide a table structure for an automotive vehicle.

It is another objective of the present invention to provide a retractable table structure disposed and carried by the exterior of the vehicle.

It is yet another objective of the present invention to provide a vehicle including a location that can be used to display certain elongated license plates from foreign countries, said location being used as a mounting location for a table structure in markets, like the United States, that require smaller license plates that can be disposed at other locations.

It is a further objective of the present invention to provide a telescoping table structure that is pivotally mounted to the exterior of a vehicle and additionally supported by support means such as a rod or tether.

In one form, the present invention concerns a table structure for a motor vehicle. Table structure is pivotally attached to the exterior of the vehicle. The table structure includes a top surface, a bottom surface, an upper edge and a lower edge. The table structure is pivotable from a first storage position to a second horizontal position that is substantially parallel to the ground/vehicle floor board and perpendicular to the exterior of the vehicle. The table structure includes a plurality of panels that are telescopically extendable from one another in a direction away from and substantially perpendicular to the vehicle exterior while the table structure is in the second position. The table structure is pivotable about its upper edge and supported in its second position by a rod that is selectively disposed in contact with both the cover and one of said plurality of panels. In another form, the table structure is pivotable about its lower edge and supported by a tether that interconnects the cover and the table structure.

Aspects of the invention are also realized in the area of global adaptation. The invention concerns a vehicle model line having a plurality of vehicle models that differ in various respects. Each of the plurality of vehicle models includes a vehicle exterior and a rear end. The vehicle exterior includes an elongated recess. The vehicle model line includes select and non-select vehicles included in the plurality of vehicle models. The select vehicle include a table structure pivotally connected to the vehicle exterior and disposed in the elongated recess. The elongated recess is used as the location for displaying a license plate in non-select vehicle models of the vehicle model line.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be written in conjunction therewith, and like reference numerals are employed to designate identical components in various views.

FIG. 3 is an exploded view of the table structure of the first embodiment of the present invention.

FIG. 4 is a cross sectional view along the line 4—4 of FIG. 1.

FIG. 5 is a perspective view of the table structure of the first embodiment of the present invention shown in fully expanded position.

FIG. 6 is a perspective view of the table structure of the second embodiment of the present invention shown in fully expanded position.

FIG. 7 is a cross sectional view along the line 7—7 of FIG. 6.

DETAILED DESCRIPTION OF THE PREFERRED EMBODIMENT

An apparatus comprising a table structure assembly is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
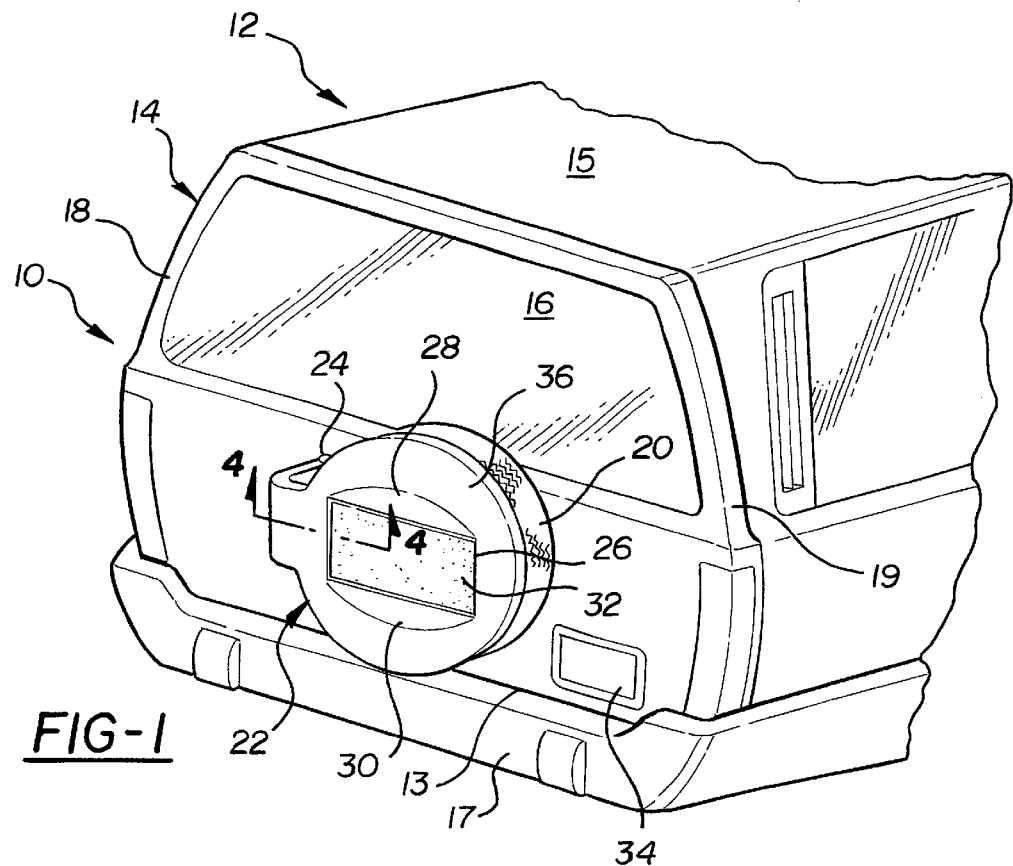
FIG. 1 is a perspective view of the rear portion of a motor vehicle.

Referring now to the drawings, FIG. 1 illustrates a perspective view of the rear end 10 of a vehicle 12, which includes the table structure of the present invention. The rear end 10 includes a type of gate 14 that pivots to allow access to the interior of the vehicle 10. The interior of the vehicle 10 includes a floor 13 that is, for the most part, parallel to the ground and parallel to and contacts the upper portion of the bumper 17 in the preferred embodiment. The gate 14 could be: a liftgate that pivots upwards about a line near the roof 15 of the vehicle 10; a tailgate that pivots downwards about a line near the bumper 17 in conjunction with the glass member 16 pivoting upward about a line near the roof 15; a split gate that portions of the gate pivot about the left pillar 18 and the remaining gate portion pivots about the right pillar 19; or a swing gate that pivots about the left pillar 18 or the right pillar 19 in conjunction with a glass member 16 that pivots upward about a line near the roof 15. In the preferred embodiment of the present invention, the rear end 10 carries a spare tire 20. The rear end 10 also carries a spare tire cover 22 that is somewhat similar to the holder described in the commonly assigned U.S. application having serial number 09/131,622 that was filed Aug. 10, 1998. Spare tire cover 22 is pivotally attached to the rear end 10 of the vehicle 12 at hinge 24. The outer surface 36 of spare tire cover 22 is preferably generally circular in nature and preferably has a radius substantially equal to the radius of the spare tire 20, however, it should be appreciated that any shape may be employed and is within the scope of the breath of the present invention.

Spare tire cover 22 includes a shallow elongated recess 26 formed therein. The recess 26 is flanked by an upper and lower bezel 28 and 30 respectively. Recess 26 is adapted to receive a table structure 32 in select vehicles. A vehicle model line is defined to have a number of vehicle models. For example, a vehicle model line could include vehicle models having 2 doors or 4 doors or vehicle models for domestic or international sale. Although each vehicle model within a vehicle model line are substantially similar, the individual vehicle models could vary slightly depending on market and consumer preference. For example, the vehicle 12 as shown in FIG. 1 is intended to be sold in the U.S. market and as such the standard U.S. sized license plate 34 can be disposed to the right (or left) of the spare tire cover 36. However, in certain foreign markets, the license plate size requirements are much larger. Some foreign countries require license plates that extend in the horizontal direction substantially farther than an U.S. license plate 34 and, hence, will not fit to the left or right of the spare tire 20. Therefore, in select vehicles, i.e. vehicles have license plate requirements similar to the U.S., the table structure 32 is disposed within recess 26 while in non-select vehicles, i.e. vehicles that require license plates larger than the U.S., the license plate replaces the table structure 32 in recess 26 or may be attached to table structure 32. Hence, recess 26 can provide a location for table structure 32 in select vehicles and a location for a license plate in non-select vehicles.

Figure 2:
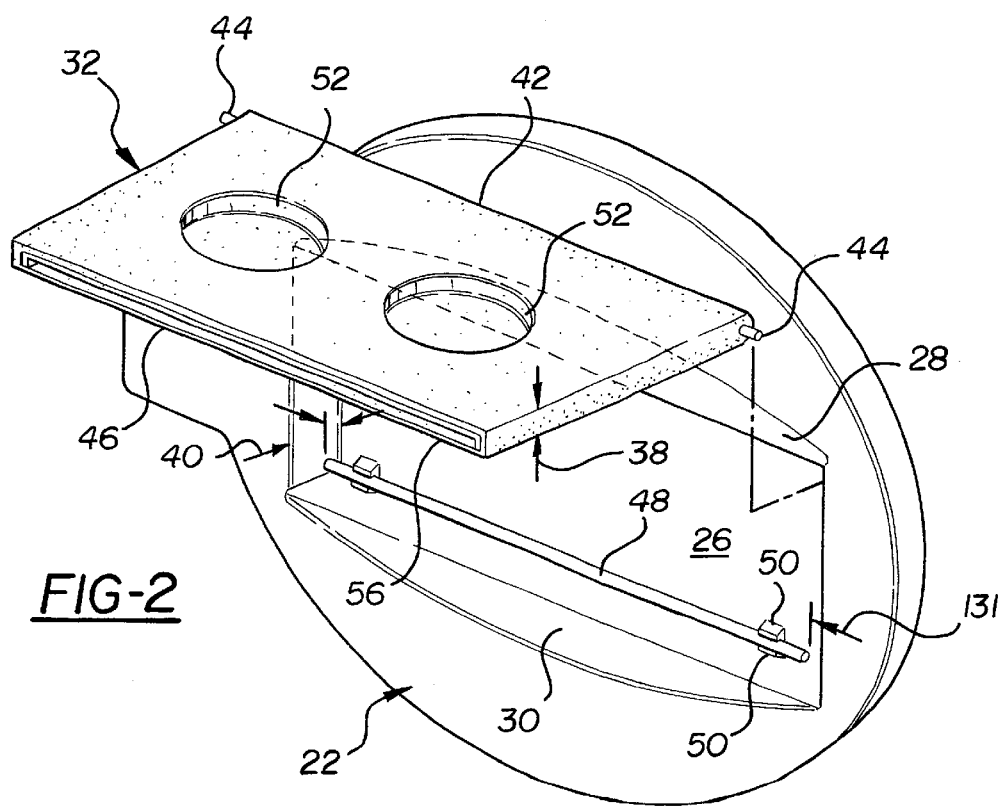
FIG. 2 is a partially exploded view of the present invention showing a table structure removed from the exterior of the vehicle.

Turning to FIG. 2 and to a discussion of select vehicles, table structure 32 and spare tire cover 22 is shown. It should be appreciated that although the preferred embodiment illustrates the table structure 32 in conjunction with the tire cover 22, the table structure 32 may be attached directly to the vehicle exterior as well. In the first embodiment, the table structure 32 is shaped like an elongated plate that has a thickness 38 that is substantially equal to the depth 40 of recess 26. Table structure 32 is pivotally attached to cover 22 near its upper edge 42. Table structure 32 includes a pair of rod like projections 44 that cooperate with either apertures or indentations (not shown) in cover 22 to provide a pivoting relationship between cover 22 and table structure 32. Table structure 32 is adapted to be held in a first vertical storage position, as shown in FIG. 1, while the vehicle 12 is in operation. The lower edge 46 is held by the cover 22 by preferably clips or resilient formations (not shown) that limit pivotal movement thereof. When use of the table structure 32 is required, the lower edge 46 is disengaged from the clips or resilient formations and pivoted from its first vertical position to a second horizontal position whereby the lower edge 46 has been pivoted away from the cover 22. Table structure 32 in the first embodiment includes a pair of depressions 52 formed on the top surface 54 thereof that can act as cupholders and are at a depth of preferably 5 mm. Table structure 32 also includes a bottom surface 56 opposing top surface 54. Upon pivoting the lower edge 46 away from the cover 22, a support rod 48 can be accessed. The support rod 48, whose function will be described in detail subsequently, is attached to cover 22 by partially bendable clips 50.

Now turning attention to the exploded view of the table structure 32 in FIG. 3. Table structure 32 includes a first panel 58 that has a top surface 54 and a bottom surface 55. First panel 58 also includes a pair of side walls 60 extending from the top surface 54 thereof Each side wall 60 includes a slot 62 that extends along the length thereof. First panel 58 also includes a pair of ledges 64 that act to support other panels. Table structure 32 also includes a second panel 70 that is disposed in a nested and telescoping relationship with first panel 58. Second panel includes a top surface 72, a bottom surface 74, a pair of side wall 75 having slots 76 formed therein and a pair of pegs 78. Pegs 78 are adapted to be received by the slots 62 of first panel 58. Pegs 78 can be spring loaded or designed with some resiliency to enable it to be inserted in slot 62. One skilled in the art can devise many alternate embodiments to accomplish the desired task. Side walls 75 have a projection 77 that has an inverse L-shaped bracket 79 extending upward therefrom. Projection 77 is adapted to be supported by ledge 64 and to slide upon ledge 64 during extending the second panel 70 from the first panel 58 telescopically. The table structure 32 also includes a third panel 80 that also has a top surface 82, a bottom surface 84, side walls 85, and a pair of pegs 86. Pegs 86 are adapted to be received by and operate in slots 76 formed in the second panel 70. Side walls 85 includes a straight flange 88 extending therefrom. The bottom surface 84 includes a support formation 87 (shown in phantom in FIG. 5) to receive support rod 48.

A cross sectional view of the assembled table structure is provided in FIG. 4. As can be seen by the cooperation of the side wall 60 and ledge 64 of the first panel 58 and the side wall 75 and projection 77 of the second panel 70, the second panel 70 is supported and can extend or slide therefrom. Likewise, the side wall 85 and straight flange 88 of the third panel 80 cooperates with the side wall 75, projection 77, and inverted L-shaped formation 79 of the second panel 70 to provide the third panel 80 support and allow the third panel 80 to slide with respect to the second panel 70. It should be appreciated that peg 78 that operates in slot 62 limits the movement of second panel 70 with respect to first panel 58 and peg 86 that operates in slot 76 limits movement of the third panel 80 with respect to the second panel 70.

Now turning to FIG. 5, an assembled and extended view of the table structure 32 is provided in the first embodiment of the present invention. The first panel 58 defines the upper edge 42, the lower edge 46, and the top surface 54 of the table structure 32, while the bottom surface 84 of the third panel 80 defines the bottom surface 56 of the table structure 32. The first panel 58 is pivotally attached by projections 44 to cover 22 at the upper edge 42 thereof. Once the table structure 32 is pivoted from its first storage position as shown in FIG. 1 wherein the bottom surface 56 is disposed closer to the cover 22 than the top surface 54, the second panel 70 and third panel 80 can be telescopically extended from the first panel 58 in a direction away from cover 22. The second panel 70 extends outwardly from the lower edge 46 of the table structure 32 and third panel 80 further extends beyond the lower edge 71 of the second panel 70. The third panel 80 includes a support formation 85 to receive rod 48 on its first end 90. Support rod 48 is disposed to contact cover 22 on its second end 92 to provide proper support to table structure 32. When support rod 48 is in position to contact both the cover 22 and the table structure 32, the table structure 32 is in its second horizontal position and is disposed substantially perpendicular to cover 22, thereby allowing it to perform its function as a table. The support rod 48 may need to be formed in a lockable telescopic manner depending on the proportions of the table structure and the recess 26. For example, if the extended rod length 141 (FIG. 5) is greater than the packaged rod length 131 (FIG. 2), the support rod 48 may need to be extendable in order to be fit laterally within the recess 26 for storage as well as support the table structure 32 in its second horizontal position. It should be appreciated that the packaged rod 48 in FIG. 2 may be disposed diagonally within recess so as to allow for a longer packed rod length 131.

Now turning to FIG. 6, a second embodiment of the present invention is illustrated. The second embodiment includes a similar telescopically extendable table structure 32. The table structure 32, however, is pivotally attached by projections 44 to cover 22 at its lower edge 46. In the storage position, the top surface 54 of the first panel 58 is disposed adjacent to cover 22. The second embodiment includes a tether support 94 that is preferably mounted to the third panel 80 at a first end 97 thereof and is adjustably secured to cover 22 via adjustable block 96 at a second end 99 thereof. The second embodiment may include a second tether depending on the characteristics of the table structure 32. With reference to FIG. 7, adjustable block 96 is larger than a corresponding aperture 98 in cover 22 so as to provide a secure stop to the tether support 94. Block 96 has a bore 98 formed therethrough for reception of tether support 94. Block 96 also includes a spring loaded peg 100 that displaces tether support 94 locally (reference numeral 95) to prevent movement of the tether support 94 within bore 98. When peg 100 is depressed, thereby compressing spring 102, the tether support can move freely within bore 98. The adjustability of the tether support 94 is important to allow the operator the option of fully extending all of the panels 58, 70, and 80 or only providing partial extension thereof It should be noted that in the second embodiment the first panel 58 includes a bottom cover 104 that is displayed while the table structure 32 is in its storage position. The bottom cover could also be adapted to carry an elongated license plate in foreign markets. The bottom cover 104 is essentially formed by providing a surface that interconnects the ledges 64 formed with the first panel 58. Bottom cover 104 is used to provide an aesthetically appealing surface on the exterior of the vehicle while the vehicle is being operated. The second embodiment may also include a light 114 that is carried by the upper bezel 28 of the cover 22. The light 114 can be used to illuminate the license plate if it is carried by the bottom cover 104 and can also be used to illuminate the table structure 32.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A vehicle comprising:

a spare tire cover mounted to the vehicle;

a table structure pivotally attached to said spare tire cover, said table structure having a top surface, a bottom surface, an upper edge, and a lower edges said table structure pivotable from a first position wherein said bottom surface is disposed adjacent to said vehicle spare tire cover to a second position wherein said top surface is disposed above said bottom surface.

2. The vehicle as set forth in claim 1, wherein said top surface of said table structure includes a depression formed thereon for reception of a beverage container.

3. The vehicle as set forth in claim 1, further comprising a rod selectively disposed between said vehicle spare tire cover and said table structure while said table structure is in said second position extending perpendicularly from said vehicle spare tire cover, said rod adapted for supporting said table structure while in said second position.

4. The vehicle as set forth in claim 3, wherein said rod also selectively disposed in a through disposed within spare tire cover, said through having a plurality of clip formations for selectively securing said rod therein.

5. The vehicle as set forth in claim 4, wherein said spare tire cover having a recess formed thereon, said table structure operatively disposed in said recess.

6. A vehicle comprising:

a spare tire cover moveably attached to said vehicle;

a table structure pivotally attached to said vehicle spare tire cover, said table structure having a top surface, a bottom surface, an upper edge, and a lower edge, said table structure pivotable from a first position wherein said top surface is disposed adjacent to said vehicle spare tire cover to a second position wherein said top surface is disposed above said bottom surface and substantially parallel to the floor of the vehicle.

7. The vehicle as set forth in claim 6, wherein said table structure having a first panel and a second panel, said second panel telescopically arranged with said first panel, said second panel capable of extending from said first panel in a direction perpendicular to said spare tire cover while said table structure is in said second position.

8. The vehicle as set forth in claim 7, farther comprising a light associated with said spare tire cover and adapted to illuminate said table structure.

9. The vehicle as set forth in claim 6, wherein said top surface of said table structure having a depression formed thereon for receiving a beverage container.

10. The vehicle as set forth in claim 6, further comprising a tether operatively connected to said spare tire cover and said table structure to provide support thereto.

11. The vehicle as set forth in claim 10, wherein said strap having an adjustable block operatively connected thereto, said adjustable block contacts said spare tire cover to establish said tether in firm connection therewith.

12. The vehicle as set forth in claim 11, wherein an attaching bracket attached to said tether, said attaching bracket interconnects said tether and said table structure.

* * * * *